March 23, 1943.    R. TEMPLE    2,314,528
UNDERWATER CABLE CUTTER
Filed Oct. 30, 1940
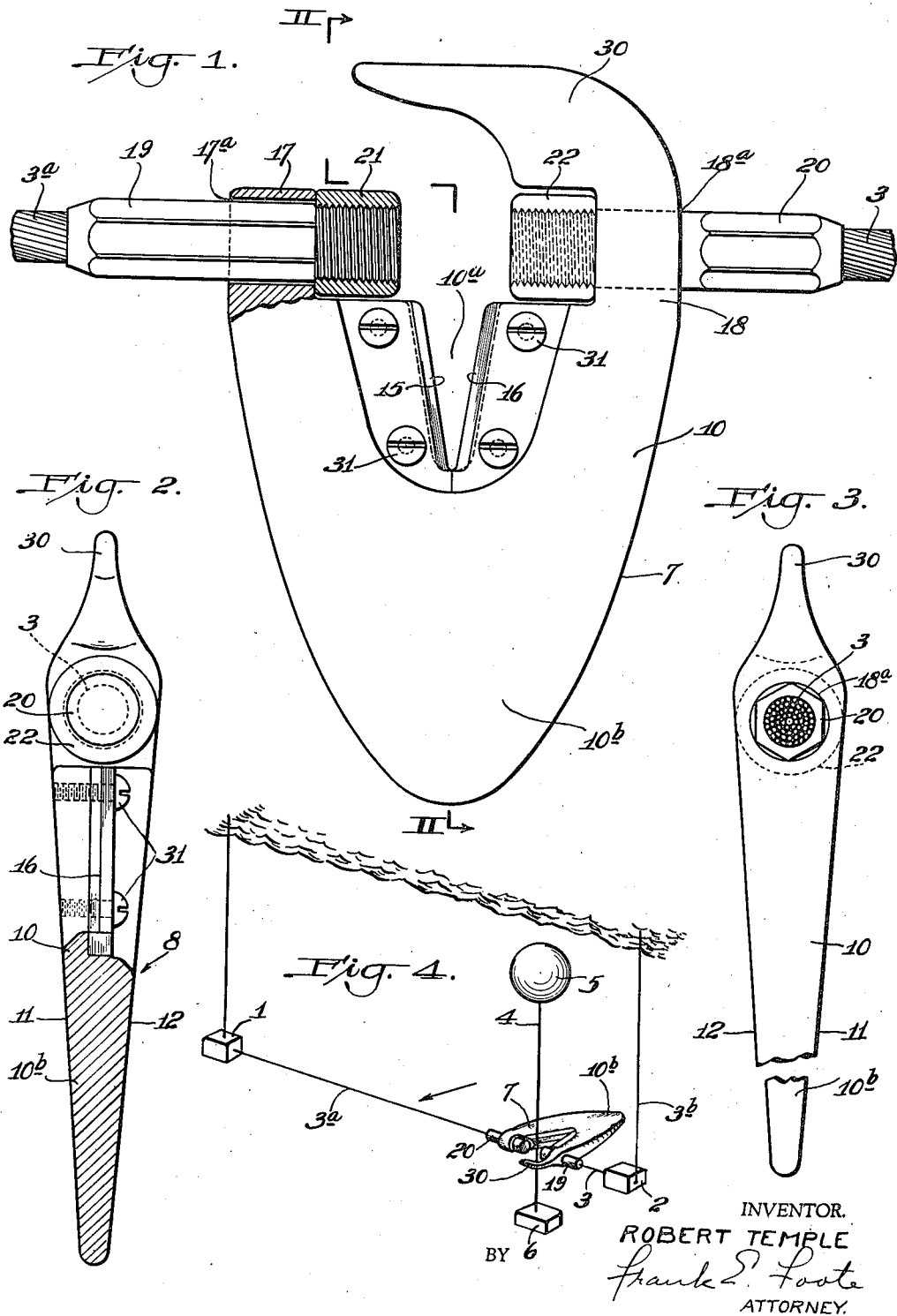
INVENTOR.
ROBERT TEMPLE
BY Frank E. Foote
ATTORNEY.

Patented Mar. 23, 1943

2,314,528

UNITED STATES PATENT OFFICE 2,314,528

UNDERWATER CABLE CUTTER

Robert Temple, Swissvale, Pa., assignor, by mesne assignments, to Temple Velocity Equipment, Inc., a corporation of Delaware Application October 30, 1940, Serial No. 363,409

7 Claims. (Cl. 114—0.5)

This invention relates to a mechanical cutting apparatus operative under water to sever a suspended metal cable by drawing or pulling the apparatus against the cable, and more particularly, to an improvement of this apparatus which is operative to eliminate forces tending to move a cutting means of the apparatus out of position relative to the direction of movement of the apparatus through water.

It becomes necessary to clear water of cables which are suspended vertically in water by means of a buoyant body, and it has heretofore been the practice to provide a tow line assembly which is generally referred to as a sweeping assembly, in which is incorporated a fixed or rigid mechanical cutter that is drawn through water and moved against a suspended cable. By the actual force applied against the cable by its opposing movement of the cutter, the cutter is effective in severing the cable. The difficulty with this apparatus is that the cable in engaging the cutter and opposing movement exerts a turning movement about the connections of the apparatus to the tow line and this action moves the cutter out of position and ineffective to sever a succeeding cable. The purpose of the sweep line is to feed cables into the cutter, and should the cutter become entangled with a cable, the whole apparatus becomes inoperative. This failure requires a withdrawal of the assembly to reposition the apparatus to its normal cutting position. Because of the extent in length of the sweep portion of the line and the dangers which may be involved, this depending upon the object of the suspended cable, it is apparent that such apparatus is unsatisfactory, very inefficient and practically unsuitable for the purpose intended.

It is an object of this invention to provide a mechanical underwater cutter which is inexpensive, compact and durable, which is adaptable for being readily incorporated in a sweep or tow line assembly and which is effective in eliminating forces exerted which tend to move the apparatus out of a cutting position when the apparatus being drawn in water confronts a cable and so that the forces exerted by the cable in opposing movement direct the cable into the fixed cutter and the apparatus is operative to quickly and effectively sever the confronted cable.

Other objects of this invention will become apparent from a description of what I now consider to be a preferred embodiment and which is illustrated in the drawing in which:

Fig. 1 is a plan view of the preferred embodiment of my mechanical cutter apparatus;

Fig. 2 is a sectional view taken along the line II—II of Fig. 1;

Fig. 3 is a side elevational view thereof; and

Fig. 4 is a perspective view illustrating one tow line or sweep assembly and a manner of incorporating my cutter apparatus.

A tow line or sweep assembly is used to move a mechanical cutter horizontally under water and at substantial depths and is also so positioned diagonally in relation to the general direction of movement of the moving or drawing body that an engaged cable is forced to move along the line toward its outer end. The line is of a great length in order to provide as much of a sweep as possible and the mechanical cutter is generally positioned at the outermost end so that the cable intervening, referred to as the sweep portion, can engage any cables that are suspended in the swept area and clear this extensive area expeditiously of cables by the use of a single mechanical cutter. In order to move the cutter and its attached tow line in a substantially horizontal direction under a great depth of water, it is customary to use a mechanism which acts as a line submerger or depressor. These mechanisms are known in the art and form no part of this invention and are diagrammatically illustrated in Fig. 4 and identified as 1 and 2. These depressors are attached directly to the tow line in spaced relation to each other and form a horizontal suspension under water of the operative sweep portion of the tow line 3. Connected to the outermost end of the sweep portion, it being considered that the depressor 1 represents the innermost end of the portion or the end that is adjacent the means provided for moving the assembly through water, is the mechanical cutter 7, and it is connected on its other side to the outer depressor 2. The end portion 3b of the tow line rises vertically to a buoyant telltale to indicate above water the position of the cutter and extent of the sweep. To represent an obstructing cable to be cleared and which is the type of arranged cable desired to be removed, a cable 4 is shown as having moved into the cutter and due to the relative movement of the sweep assembly indicated by the directional arrow, the cable is forced against the cutter, Fig. 4. The suspended cable 4 is attached to a buoyant body 5 and a dead weight 6 which substantially vertically suspend the cable in water. The sweep portion 3a intermediate the cutter and the innermost depressor 1 which is ordinarily of a length of several thousand feet is effective because of its diagonal disposition relative to the general direction of movement of the drawing body to move any engaged cable into the cutter. The functioning of the cable sweep assembly is a matter known in the art and not forming a part of this invention. This angular disposition of the line to the direction of movement of the propelling or moving body is not very great because it is desired that the mechanical cutter 7 be moved substantially in the general direction of movement in order that the greatest cutting force be applied to the cutter to provide a quick action in severing the cable.

This invention is concerned with an improvement of the rigid cutter 7 used as a part of the assembly. This improvement consists principally of an apparatus effective due to the positioning of the cutter in such a relation to the engagement of the supporting body to the tow line that no forces are exerted by engagement of the cutter with a suspended cable to produce a turning moment and move the apparatus and cutter out of a cutting position.

Referring to Figs. 1, 2 and 3, the support body 10 is made preferably of suitable metal material and is fin-like, that is, it is, generally speaking, flat in shape and has flat surfaces 11 and 12 of substantial area and sufficient to position the support when drawn through water so that the flat surfaces are horizontally positioned. It is apparent that the forces of the water acting on oppositely disposed flat surfaces tend to hold the support in a general horizontal alignment and by making the surfaces of sufficient size, the support is held in this position with substantial stabilization. The support is somewhat of a C-shape and contains a properly shaped opening 10a to accommodate in the main portion of the body a cutter illustrated as a pair of cutter bars 15 and 16 which are merely metal bars having a sharpened edge and attached to the support by means of bolts 31 threaded to the body of the support. These bars are positioned angularly in relation to each other and this angular disposition should be of a gradual nature so that a cable confronting the bars does not meet too much of an immediate obstruction but is allowed to progress gradually into the bars and thus cause a gradual severing or cutting operation.

The support is arranged so that it has spaced portions 17 and 18 on each side of the bars and forwardly thereof. To these portions are attached the tow line and some form of engageable means is supplied to provide ready attachment of the cutter to the line. The principal feature of this invention is that the tow line is attached to the cutter support ahead of the cutter relative to the direction of movement through the water. For the purpose of illustration of a connection, each of the forward portions has openings 17a and 18a, respectively. These openings are positioned on each side of the cutter bars and through which connectors 19 and 20 attached to the tow line 3 are passed and held in place by means of collars 21 and 22 engaging the ends and abutting an inside surface of the forward portions. These connectors are swaged normally to the cable to provide a secure attachment as by the use of my explosively operated tool described and claimed in U. S. Patent No. 2,064,129. It is preferred that the opening through which the end of the sweep portion 3a of the line passes be made large enough so that the connector fits loosely therein and allows turning of the portion since considerable turning moment is applied by the water to the long line and it is advisable that these forces should be dissipated by allowing free movement of the portion relative to the cutter. The other opening can be made so that the support engages its connector and holds the cable in a fixed position. For illustration, opening 17a represents the opening through which the portion 3a passes and the connector 19 is freely rotatable while 18b represents the opening in which the connector 20 is made tight. With this apparatus and its connection to the tow or sweep line, the engagement of the cutter 15 and 16 with a cable produces no forces which can move the support about the tow line.

Heretofore, the cutter bars have been positioned in front of the location of attachment of the support to the tow line and this has caused an engaged cable to exert a turning moment about the line which is effective to turn the cutter about the line and position the cutter out of a cutting position. The result was a much delayed action in cutting or a failure and this required the removal of the entire assembly from the water and the disengagement of the cable from the mechanical cutter.

In my invention, it is apparent that if the support is moved through the water and the cable passes in the cutter that the force applied is effective in carrying the cable into the cutter and producing a severance or cutting of the cable itself, this being due to the horizontal component present in the force of the cable opposing movement of the cutter. The cutters being positioned rearward of the engageable means, any downwardly directed force is resisted by the stabilizing force of the support and, furthermore, would be of little consequence in interfering with the cutting action. This is the advantage gained, and although involving simple expedients, it satisfies the need that has existed for some time. In fact, other types of cutting apparatus have been resorted to which involved greater expense of operation and increased cost of apparatus and these have given unsatisfactory results.

Forwardly of the engageable means is provided an extended hook-like portion 30 that is integral with the forward portion 18 of the support and it extends toward the other forward portion or in the direction in which a cable moves into the cutter. The purpose of this portion is to prevent the passage of a cable moving along the sweep portion 3a to pass beyond the cutter.

It is not intended that this invention be limited to this preferred embodiment which is described in detail and which discloses the principle involved and a mode of operation of my invention, and it is to be understood that the invention can be practiced otherwise and is to be limited only by the scope of the appended claims.

I claim:

1. An underwater cable cutter comprising an elongated flat plate having a slot extending inwardly from one end, means formed on the plate at the outer opposite sides of the slot to engage a sweep line, cutter means mounted on the side edges of the slot rearwardly of said line-engaging means and having cutting surfaces converging inwardly of the slot arranged to cut a cable vertically suspended in the water, said plate having sufficient area of flat surfaces to position and stabilize itself when drawn through water and to thus maintain the cutter means in operative position.

2. An underwater cable cutter comprising an elongated flat body, the body having opposite surfaces with sufficient area to position and stabilize the body in water when drawn therethrough, the body having spaced forward portions with means at their front ends to connect the body into a sweep line, cutter means mounted on said body behind said line-engaging means and having rearwardly converging cutting surfaces projecting between said spaced forward portions and operative to substantially instantly cut an engaged cable vertically suspended in the water.

3. An underwater cable cutter comprising a plate having relatively large flat oppositely disposed outer surfaces with sufficient area to position and stabilize the plate in water when drawn therethrough so that the flat surfaces are maintained substantially in alignment with the general direction of movement, cutter means having rearwardly converging cutting surfaces mounted on the plate and operative to substantially instantly cut an engaged cable vertically suspended in water, and means formed on the plate to connect it into a sweep line, said means being positioned on each side of and at the front end of said cutter means relative to the general direction of movement.

4. An underwater cable cutter comprising an elongated plate having oppositely disposed flat surfaces with sufficient area to position and stabilize the plate in a predetermined manner in water when drawn through it, the plate having laterally spaced forward portions, means formed on each of said portions to connect the plate into a sweep line, and rearwardly converging cutter bars mounted on said plate behind said line-engaging means with their cutting edges projecting into the space between said forward portions, said cutter bars being operative to substantially instantly sever an engaged cable vertically suspended in water.

5. An underwater cable cutter comprising a metal body having relatively large oppositely disposed flat surfaces with sufficient area to position and stabilize the body in water when it is drawn through it so that the flat surfaces are maintained in alignment substantially with the general direction of movement of the body through water, cutter bars mounted on the body intermediate its sides and between said flat surfaces with the bars being convergingly arranged in a graduate manner rearwardly and adaptable cooperatively to cut a cable vertically suspended in water, said body having side portions extending forwardly of the cutter bars, and means formed on each of the side portions to connect the body into a sweep line, and said means being formed to permit relative movement of the sweep line and said body.

6. An underwater cable cutter to be connected to the outer extent of a submerged portion of a substantially horizontal sweep line disposed diagonally to the direction of movement of a propelling body, said cutter comprising a metal plate having relatively large oppositely disposed flat surfaces, the flat surfaces having sufficient area to position and stabilize the plate in water when it is drawn through it so that the flat surfaces are maintained in substantially horizontal position, the plate having a central opening extending rearwardly, cutter bars mounted in said opening between and substantially parallel to the flat surfaces, the bars being convergingly arranged rearwardly to substantially instantly cut a cable vertically suspended in water, said plate having side portions extending forwardly of the outer extent of the cutter bars, and engageable means formed on each of said side portions to connect the plate to the outer extent of the horizontal portion of the sweep line and to another portion thereof, said means permitting relative movement of the horizontal portion of the sweep line, and said plate having an integral hook-like portion extending forwardly and toward the horizontal sweep-line portion to direct a cable moving along the line into the cutter bars.

7. An underwater cable cutter comprising a flat-shaped plate, the plate having a C-shape end with horizontal surfaces having sufficient area to position and stabilize the plate in water when drawn through it, means formed on the laterally spaced portions of the plate for connecting it into a sweep line, cutter bars acutely disposed and mounted on the plate in alignment with the horizontal surfaces and rearwardly of the line-engaging means and arranged to substantially instantly cut an engaged cable vertically suspended in water.

ROBERT TEMPLE.